United States Patent
Siira

Patent Number: 5,878,062
Date of Patent: Mar. 2, 1999

[54] DATA TRANSFER METHOD AND A CELLULAR RADIO SYSTEM

[75] Inventor: Mikko Siira, Tokyo, Japan

[73] Assignee: Nokia Telecommunications Oy, Espoo, Finland

[21] Appl. No.: 789,180

[22] Filed: Jan. 24, 1997

[51] Int. Cl.⁶ .............................. G06F 11/10; H03M 13/00
[52] U.S. Cl. ......................... 371/53; 371/37.01; 371/37.7; 371/49.1
[58] Field of Search ............................. 371/53, 48, 37.01, 371/37.7, 43.1, 49.1; 455/67.1

[56] References Cited

U.S. PATENT DOCUMENTS

| | | | |
|---|---|---|---|
| 5,084,891 | 1/1992 | Ariyavisitakul et al. | 371/42 |
| 5,564,074 | 10/1996 | Jutti | 455/67.1 |

OTHER PUBLICATIONS

TIA/EIA IS–95 (ANSI J–STD–008) "Requirements for Base Station CDMA Operation".

TIA/EIZ IS–96 "Speech service Option Standard for Wideband Spread Spectrum Systems", Jul. 1996.

Primary Examiner—Phung M. Chung
Attorney, Agent, or Firm—Pillsbury Madison & Sutro LLP

[57] ABSTRACT

A cellular radio system at least one transceiver which receives a signal packed into frames, a coder for channel coding the signal received by the transceiver prior to transmitting the signal as bits, and a vocoder for source coding the signal. The coder forms and adds check bits to the signal to be transmitted, the check bits being used in detecting errors causes by transmitting the signal. The coder adds the check bits in the channel coding to reduce the number of bits in the frames received by the transceiver.

16 Claims, 2 Drawing Sheets

# DATA TRANSFER METHOD AND A CELLULAR RADIO SYSTEM

FIELD OF THE INVENTION

The present invention generally relates to communication systems. More specifically, the invention relates to a digital cellular radio system in which check bits are added to a signal.

BACKGROUND OF THE INVENTION

The standard TIA/EIA IS-95 defines channel coding carried out for the signal in a base station of a cellular radio system. The standard defines the channel coding employed in data transfer on an Air interface between a base station and a subscriber terminal of a cellular radio system. The standard defines the channel coding to be carried out in a channel coder of the base station. In the channel coder defined by the standard, the signal is CRC block-encoded (CRC=Cyclic Redundancy Check), convolutional-coded and interleaved. The interleaving is followed by converting the signal into an RF signal and transmitting it on the radio path to the subscriber terminal.

The standard TIA/EIA IS-96 determines a variable-rate speech encoder employed in the cellular radio network. As the variable-rate encoder, for example a CELP vocoder (CELP=Code Excited Linear Predictive) has been used. The standard defines PCB (PCB=Parity Check Bits) and CRC calculation for several different data rates, such as 1200 kbit/s, 2400 kbit/s, 4800 kbit/s and 9600 kbit/s. In addition, the standard defines signal interleaving for all the above-mentioned data rates. The PCB calculation has in the standard been defined to be carried out in the vocoder in connection with the source coding. In prior art, the vocoder is in the TRAU unit (TRAU=Transcoder/Rate Adaptor Unit), located apart from the base station. The TRAU unit is located, for example, at the base station controller or the mobile services switching center.

The TRAU unit is used in signal source coding, adapting the data rate to be suitable for the transfer network, e.g. the PSTN network (PSTN=Public Switched Telephone Network), and for transmitting TRAU frames to the base station. The TRAU unit codes the 64 kbit/s signal originating from the PSTN network to a 16 kbit signal, whereby the user data rates are at the aforementioned levels. The TRAU unit serves as the source coder, reducing the bandwidth on the Air interface between the base station and the subscriber terminal.

The prior art TRAU frame is, e.g. 192 bits long before and after the convolutional coding. The convolutional coding is carried out in the channel coder. It takes 20 ms to transmit a frame. The frame comprises, e.g., 172 information bits, 12 CRC bits and 8 tail bits. In the aforementioned case, the data rate is 9600 kbit/s. The frame comprises one MM bit (MM=Mixed Mode Bit). The remaining part of said frame, i.e. 171 bits, is allocated for traffic.

In prior art, the calculation of PCB bits, the coding and decoding of PCB bits is carried out in the vocoder i.e. the TRAU unit. The calculation, coding and decoding of the bits requires bit buffering, which causes delay. The CRC block encoding is performed at the base station in connection with channel coding. In calculating CRC block encoding and bit interleaving, additional buffering is required, resulting in additional delay. In addition, the prior art solution takes up a lot of transmission path capacity.

SUMMARY OF THE INVENTION

It is therefore an object of the present invention to implement a method by means of which the transmission delay and capacity taken up by the signal may both be reduced.

This object is achieved by a data transfer method according to the invention, employed in a cellular radio system comprising at least one transceiver which receives a signal packed into frames and which channel codes the signal prior to transmission, the signal consisting of bits, and the method comprising the steps of source-coding the signal and adding check bits thereto, the check bits being utilized in detecting errors caused by transmitting the signal, and being added in the channel coding to reduce the number of bits in the frames received by the transceiver.

The invention further relates to a cellular radio system comprising at least one transceiver which receives a signal packed into frames, means for channel coding the signal received by the transceiver prior to transmitting the signal, which consists of bits, and a vocoder for source-coding the signal, in which the means form and add check bits to the signal to be transmitted, the check bits being utilized in detecting errors caused by transmitting the signal, and in which the means add the check bits to the signal in the channel coding in order to reduce the number of bits in the frames received by the transceiver.

The solution according to the invention provides significant advantages. In the solution, check bits are generated to be added to the signal, and these check bits are utilized in detecting errors resulting from transmitting the signal. The check bits are added in connection with channel coding and not source coding. When the check bits are added only at the channel coding, it is possible to reduce the number of bits in the frames received by the transceiver. In practice, reducing the number of bits means that transmission path capacity may be saved for other uses.

The check bits are generated and added to a signal advantageously when the frame rate of the signal is substantially at the maximum. In an order determined by source coding, the transceiver serving as the channel coder receives a signal packed into the frame Channel coding is carried out at the same rate as source coding, resulting in that signal buffering is not required to the same extent as before. The reduced buffering requirements enable reducing signal delay. When receiving a signal containing check bits, the signal is first CRC block-decoded. After the CRC block decoding, the signal is PCB decoded, and then it is transmitted to the vocoder.

BRIEF DESCRIPTION OF THE DRAWINGS

In the following, the invention will be described in closer detail with reference to the examples shown in the attached drawings, in which.

DETAILED DESCRIPTION OF THE PREFERRED EMBODIMENTS

Figure 1:
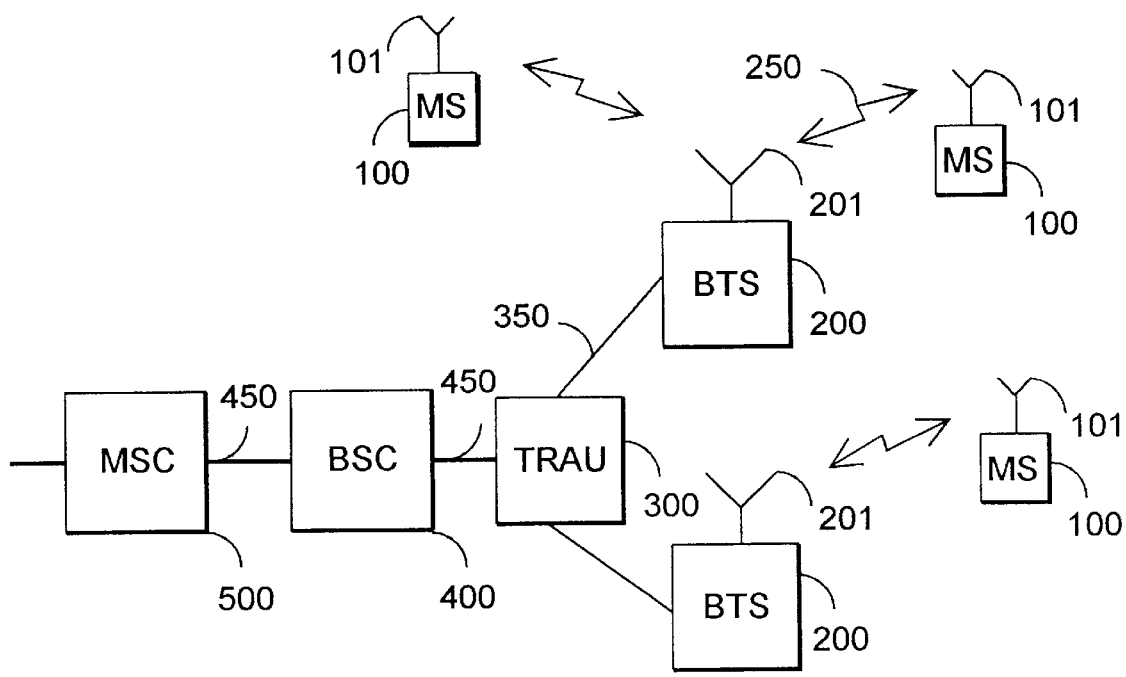
FIG. 1 shows a cellular radio system to which the method of the invention is applicable.

The solution is applicable to spread spectrum systems, particularly to CDMA systems employing frequency hopping. In the following, the invention will be described based on the aforementioned facts without, however, restricting thereto. FIG. 1 shows a cellular radio system comprising subscriber terminals 100, base stations 200, a TRAU unit 300, a base station controller 400, and a mobile services switching center 500.

In the solution according to the invention, the base station 200 is connected to the subscriber terminal 100 via a signal 250 transmitted on the radio path. The connection between the base station 200 and the subscriber terminal is referred to as an Air interface. In addition, the base station 200 communicates with the base station controller 400. The connection between the base station 200 and the base station controller 400 is referred to as an Abis interface. The base station controller 400 further communicates with the mobile services switching center 500. The connection between the base station controller 400 and the mobile services switching center 500 is referred to as an A interface. The operating frequency of the cellular radio system illustrated by the figure may be e.g., 800 MHz. The cellular radio system may also be, represented by, e.g., a the PCS system (PCS= Personal Communication System), operating in the 1.9 GHz frequency range. The TRAU unit 300 comprised by the cellular radio system is located between the base station 200 and the base station controller 400.

In the arrangement according to the figure, the mobile services switching center 500, the base station controller 400 and the TRAU unit 300 are connected via a digital transmission link 450, by utilizing, e.g., PCM technique. The TRAU unit 300 and the base station are connected with practically a similar transmission link 350. The base station 200 comprises an antenna 201, and the subscriber terminal comprises an antenna 101. The antennas 101, 201 function as transmitting and receiving antennas. The base station 200 according to the figure transmits, using the antenna 201, a signal to the subscriber terminal 100, which receives the signal by the antenna 101. In the solution according to the invention, the subscriber terminals 100 are, e.g., mobile phones. The base station 200 establishes a connection to the subscriber terminal 100 by means of the signal 250 transmitted on the radio path. The mobile services switching center 500 receives a signal from, e.g., the PSTN network, the signal comprising PCM channels which usually have the data rate of 64 kbit/s.

Figure 2A:
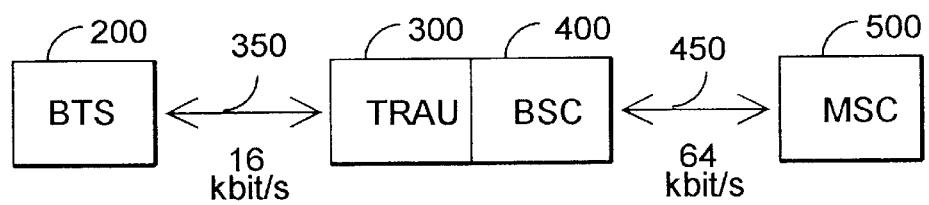
FIG. 2a illustrates a first preferred location for the TRAU unit.
Figure 2B:
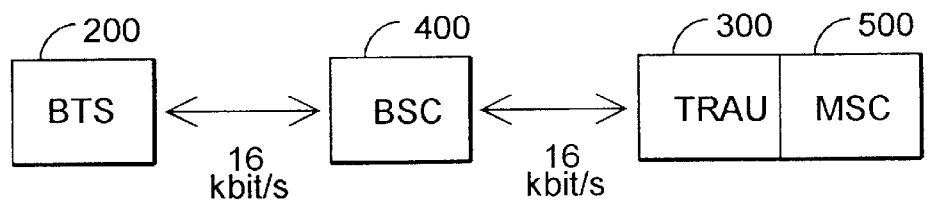
FIG. 2b illustrates a second preferred location for the TRAU unit.

In FIG. 2a, the TPAU unit 300 is located at the base station controller 400. The TRAU 300 according to the figure serves as a transcoder. The TRAU unit 300 codes and decodes data contained by the signal, said data being for example coded speech. In addition, the TRAU unit adapts different bit rates, such as the 64 kbit/s data rate used in the PCM signal, into a data rate of 16 kbit/s. In FIG. 2a, the TRAU unit 300 and the base station 200 transmit to each other data packets which are arranged as TRAU frames. According to the solution of the figure, the mobile services switching center 500 supplies a signal to the TRAU unit 300 via the base station controller 400. The signal forms a channel whose rate is 64 kbit/s. The TRAU unit 300 transcodes the signal into a rate of 16 kbit/s, and transmits the transcoded signal further to the base station 200. In FIG. 2b, the TRAU unit 300 is located at the mobile services switching center 500. In FIG. 2b, the transcoder codes the signal provided by the mobile services switching center 500 so that after the transcoding the channel rate is 16 kbit/s. According to the solution directed in the figure, the signal 450 received by the base station controller 400 has already been transcoded, and therefore the signal has the rate of 16 kbit/s.

The TRAU unit 300 codes a signal formed, e.g., from speech. The TRAU unit 300 varies, as needed, the coding rate employed in the signal encoding. In practice, the speech coding is carried out by a variable-rate speech encoder, i.e. a vocoder. The vocoder may be implemented by, e.g., a DSP technique. The TRAU unit 300 codes a PCM signal supplied by e.g. the PSTN network so that the signal rate will be lower. During the signal encoding, the data rate of the signal decreases to, e.g., 9.6 kbit/s. The TRAU unit 300 operates in the case described above as a source coder. It is assumed in the solution according to the invention that the TRAU unit 300 serves as a remote transcoder, which means that the TRAU unit 300 is located separate from the base station 200. The TRAU unit 300 decodes the 16 kbit/s signal received from the base station 200 back to a 64 kbit/s signal. Accordingly, the TRAU unit 300 operates as a speech encoder i.e., a vocoder.

The base station 200 serves as a channel coder in the solution depicted in the figure. The vocoder and channel coder transmit and receive data packets, i.e. frames, at intervals of, e.g., 20 ms. Channel coding minimizes the problems caused by the signal becoming weaker, such as errors in the signal. In the channel coding, extra bits are added to the signal. These extra bits contain, from the user's point of view, less essential information, i.e. redundancy. Further, channel coding corrects errors. Channel coding minimizes signal errors, which result particularly from the signal going through the Air interface.

Figure 3:
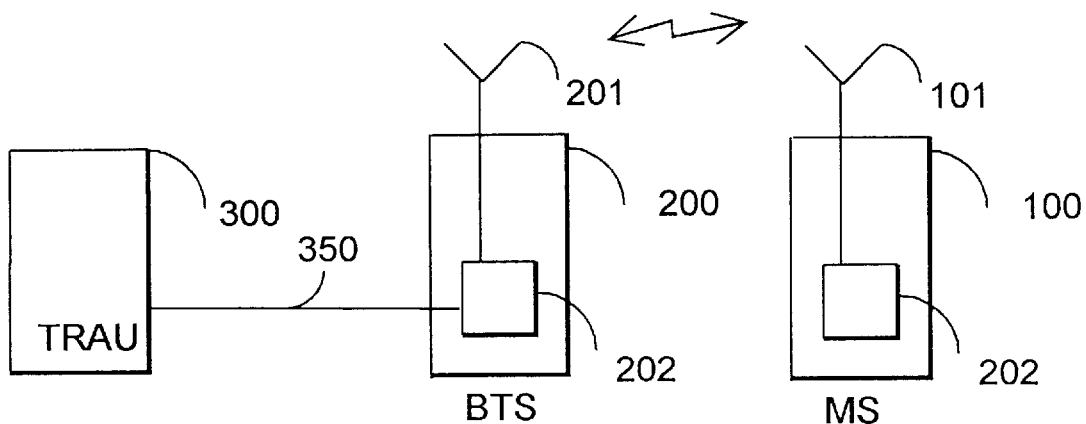
FIG. 3 shows a schematic diagram for a base station of the cellular radio system.

FIG. 3 shows a schematic block diagram of the base station 200. The base station 200 comprises means 202 for coding and decoding the PCB bits of the signal. In addition, the means 202 have been arranged to CRC block-encode and CRC block-decode the signal. In addition, the means 202 comprised by the base station 200 have been arranged to convolutional-code and convolutional-decode the signal. Further, the means 202 comprised by the base station 200 have been arranged to interleave and deinterleave the signal. The subscriber terminal 100 comprises substantially the same parts as the base station 200. According to the solution depicted in the figure, the channel coding is carried out by means of block encoding and convolutional coding. Besides the base station 200, the channel coder may also be located at, e.g., the subscriber terminal 100. The base station 200 further comprises an antenna 201. The means 202 convert the interleaved signal to an RF signal and transmit the RF signal via the antenna 201 to the subscriber terminal 100. Like the base station 200, the subscriber terminal 100 also comprises the means 202.

By utilizing block encoding, it is possible to detect errors in the signal. The means 202 CRC block-encode the signal and inserts the encoded signal into the blocks. In the block encoding, the means 202 add extra bits to the signal; for example, two bits may be added. Prior to carrying out the block encoding, the means 202 calculate parity for the signal to be block-encoded. To the end of each block, parity or, e.g., checksum is inserted. Errors in the signal may be detected by using the parity or checksum. Upon receiving a signal containing check bits, a block and frame check corresponding to the check bits is decoded from the check bits at the transceiver. In the block decoding, e.g. 161 actual data bits and, e.g., 12 check bits are received. After this, with the aid of the check bits, information on the correctness of the actual signal may be obtained.

Further, the means 202 convolutional code the signal. In the convolutional coding, one bit generates a plurality of bits, for example two bits. By convolutional coding, all the errors that can be detected by block encoding can be corrected. The bit to be convolutional-coded does not alone influence the bits to be generated, but they are also affected by the state of the bit preceding the bit to be convolutional-coded.

The means 202 PCB and CRC code the signal 350 received from the TRAU unit 300. Additionally, the means 202 PCB and CRC decode the signal transmitted by the subscriber terminal 100 to the base station 200. According to the solution provided by the invention, the PCB and CRC coding are performed in the base station 200 serving as a channel coder and not in the TRAU unit 300 serving as a vocoder. The aforementioned location for the PCB and CRC coding and decoding enables saving capacity of a signal 350 propagating on the transmission path. Additionally, the delay of the signal using the transmission path will be smaller due to the TRAU 300 transcoding and transmitting the bits it has encoded to the base station in the same order as the bits arrive in the TRAU unit 300. In addition, the channel coding is carried out at the frame rate employed in the source coding, making it possible to reduce the transmission path delay.

Figure 4A:
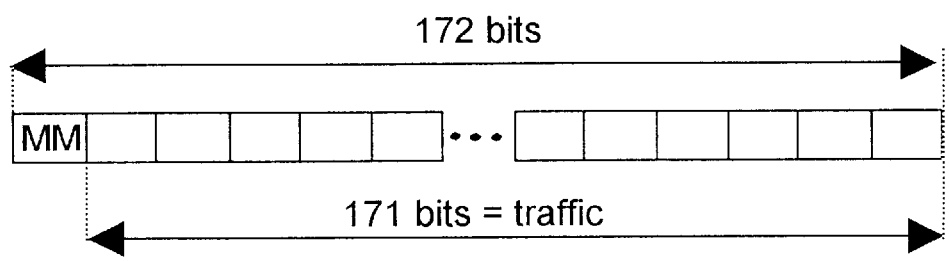
FIG. 4a shows a prior art TRAU frame.

FIG. 4a illustrates a prior art TRAU frame propagating between the base station 200, serving as a channel coder, and the TRAU unit 300, serving as a source coder. The frame comprises 172 bits out of which 171 are allocated for traffic. The frame comprises an MM bit (MM=Mixed Mode Bit), used to indicate the frame type. The data rate of the frame in the figure is 9.6 kbit/s.

Figure 4B:
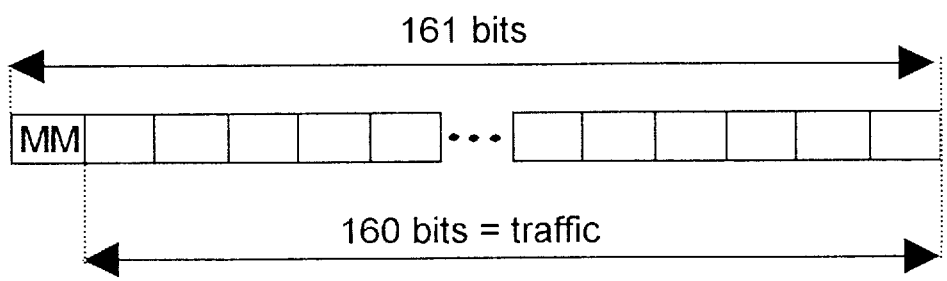
FIG. 4b shows a TRAU frame formed according to the solution of the invention.

FIG. 4b illustrates a TRAU frame formed by the method according to the invention, the TRAU frame propagating between the channel coder and the source coder. The frame comprises only 161 bits out of which 160 are allocated for traffic. The frame also comprises an MM bit to indicate the frame type. In this case, the data rate is as low as 8.05 kbit/s. As the solution of the invention requires 11 bits less than the prior art solution, the capacity saved can be used for other purposes. The capacity saved may be used, e.g. in connection with traffic concentrators of the Frame Relay type between the vocoder and the base station.

In the solution provided by the invention, the number of bits in the frame of the signal 350 is reduced by carrying out the PCB and CRC coding and decoding at the base station 200. In addition, the PCB and CRC coding and the PCB and CRC decoding may be carried out at the subscriber terminal 100. Moving the PCB and CRC calculation from the TRAU unit 300 reduces signal buffering, thus making the signal delay smaller. At the same time, data transfer between the base station 200 and the TRAU unit 300 may be reduced whereby the capacity saved may be used for other purposes. Adding the PCB and CRC bits is advantageously carried out when the TRAU frame rate is substantially at the maximum.

Although the invention is above described with reference to the example in the attached drawings, it is obvious that the invention is not restricted thereto but may be varied in many ways within the invention claimed in the attached claims.

I claim:

1. A method for transferring data in a cellular radio system, comprising:
   source-coding a signal by a vocoder;
   forwarding the source-coded signal to a base station having a transceiver;
   receiving the source-coded signal at said base station as a signal consisting of bits packed into frames;
   channel coding said source-coded signal at said base station, and, in association with said channel coding, adding to said source-coded signal check bits which are cyclic redundancy (CRC) bits and parity check bits (PCB), for use by a receiver in detecting errors caused in connection with transmitting a resulting signal by said transceiver, said adding of said check bits being accomplished apart from said vocoder, for thereby reducing the number of bits per frame as received by said transceiver compared with what would pertain if the check bits were added at said vocoder; and
   transmitting said resulting signal by said transceiver as a source-coded and channel-coded signal packed in frames and containing said check bits.

2. The method of claim 1, wherein:
   said adding of said check bits is accomplished immediately prior to accomplishing said channel coding.

3. The method of claim 1, wherein:
   said source-coding is accomplished prior to said adding of said check bits; and
   between accomplishing said source-coding and said channel coding, said forwarding of said source-coded signal is accomplished at at least two different data rates.

4. The method of claim 3, wherein:
   said at least two different data rates includes a maximum frame rate; and
   said adding of said check bits is accomplished in connection with accomplishing said channel coding, when said source-coded signal is being forwarded a rate which is substantially at said maximum frame rate.

5. The method of claim 3, wherein:
   said adding of said check bits is accomplished when said as source-coded signal is being forwarded at a rate which is substantially 9.6 kbit/s.

6. The method of claim 1, wherein:
   an order of frames and a frame rate is established for said source-coded signal in connection with said source-coding of said signal; and
   said source-coded signal is received by said base station for channel-coding in said established order of frames and at said established frame rate.

7. The method of claim 1, further comprising:
   at said transceiver, receiving a signal containing recited check bits; and
   decoding a block check corresponding to the received check bits at said transceiver.

8. The method of claim 1, further comprising:
   receiving by a second transceiver associated with a second vocoder, of said resulting signal as a result of said transmitting by said transceiver; and
   CRC block-decoding and PCB decoding said resulting signal by said second transceiver and associated second vocoder.

9. A cellular radio system, comprising:
   a vocoder arranged for source-coding a signal to provide a source-coded signal;
   a base station having a transceiver placed apart from said vocoder;
   means for forwarding the source-coded signal to the base station, for reception at the transceiver as a signal consisting of bits packed into frames;
   a channel coder arranged for channel coding the source-coded signal received by the base station as a result of said forwarding, and means for adding to said source-coded signal, apart from said vocoder, in association with said channel coding, check bits which are cyclic redundancy (CRC) bits and parity check bits, for use by a receiver in detecting errors caused in connection with transmitting a resulting signal by said transceiver, for thereby reducing the number of bits as received by said transceiver compared with what would pertain if the check bits were added at said vocoder; and said transceiver being arranged for transmitting said resulting signal as a source-coded and channel-coded signal packed in frames and containing said check bits, for reception by a receiver.

10. The cellular radio system of claim 9, wherein:

said means for adding is arranged for adding said check bits immediately prior to accomplishment of said channel coding by said channel coder.

11. The cellular radio system of claim 9, wherein:

said means for forwarding is arranged for forwarding said source-coded signal at at least two different frame rates, one of which is a maximum frame rate.

12. The cellular radio system of claim 11, wherein:

said means for adding is arranged for adding said check bits to said source-coded signal when said source-coded signal is being forwarded substantially at said maximum frame rate.

13. The cellular radio system of claim 9, wherein:

said means for adding is arranged for adding said check bits to said source-coded signal when said source coded signal is being forwarded at a frame rate which is substantially 9.6 kbits/s.

14. The cellular radio system of claim 9, wherein:

said means for forwarding is arranged to forward said source-coded signal in a same order as source-coded by said vocoder and at same a frame rate as is employed in said source-coding.

15. The cellular radio system of claim 9, wherein:

said means for adding, upon reception of a signal containing received check bits by said transceiver, is arranged for decoding a block check corresponding to the received check bits.

16. The cellular radio system of claim 9, wherein:

said means for adding, upon reception of a signal containing received check bits by said transceiver, is arranged to CRC block-decode and PCB decode said signal containing received check bits.

* * * * *